United States Patent [19]

Mader

[11] Patent Number: 4,999,681

[45] Date of Patent: Mar. 12, 1991

[54] REAL-TIME HALOGRAPHIC INTERFEROMETRY WITH A PULSED LASER AND FLICKER-FREE VIEWING

[76] Inventor: David L. Mader, 1294 Islington Ave., Apt. 704, Islington, Ontario, Canada, M9A 3K2

[21] Appl. No.: 211,439

[22] Filed: Jun. 24, 1988

[51] Int. Cl.⁵ ............................................... G01B 9/02
[52] U.S. Cl. ...................................... 356/347; 350/3.6
[58] Field of Search ................. 356/347; 350/3.6, 3.75

[56] References Cited

U.S. PATENT DOCUMENTS

| | | | |
|---|---|---|---|
| 3,572,882 | 3/1971 | Neumann | 350/3.5 |
| 3,572,936 | 3/1971 | Johnson | 356/109 |
| 3,631,713 | 1/1972 | Marom | 73/67.3 |
| 3,633,987 | 1/1972 | Brooks | 350/3.5 |
| 3,649,754 | 3/1972 | Macovski | 178/6.8 |
| 3,670,098 | 6/1972 | Korpel | 178/6 |
| 3,672,776 | 6/1972 | Brooks | 356/106 |
| 3,717,415 | 2/1973 | Woerdman | 356/168 |
| 3,735,036 | 5/1973 | Macovski | 178/6.8 |
| 3,778,130 | 12/1973 | Waters | 350/3.5 |
| 3,802,758 | 4/1974 | Havener et al. | 350/3.5 |
| 3,828,126 | 8/1974 | Ramsey | 178/6.8 |
| 3,860,346 | 1/1975 | Kersch et al. | 356/109 |
| 3,883,215 | 5/1975 | Kurtz | 350/3.5 |
| 4,280,764 | 7/1981 | Sica et al. | 356/35.5 |
| 4,591,996 | 5/1986 | Vachon | 354/508 |
| 4,612,797 | 9/1986 | Barkhoudrian | 73/40.5 R |
| 4,620,223 | 10/1986 | Haskell et al. | 358/107 |

OTHER PUBLICATIONS

'Holographic and Nonholographic NDT for Nuclear and Coal-Fired Power Plants' David L. Mader, SPIE vol. 604, Holographic Nondestructive Testing (1986) pp. 37-55.
'Holography Applied to Inspection & Mensuration in an Industrial Environment' Tozer et al., SPIE vol. 523, Applications of Holography (1985) pp. 119-130.
'Vacuum Speckle Interferometry for Long Term Monitoring of In-Plane Strains at Defect Sites in Nuclear Pressure Tubes' Mader et al., SPIE vol. 746, Industrial Laser Interferometry (1987) pp. 113-120.
'The Making and Evaluation of Holograms' Abramson, Academic Press, 1981, pp. 75-77, 97-107.
'Holograhic Inteferometry on Pipes: . . . ' David L. Mader, Applied Optics, vol. 24, No. 22, 11/15/1985, pp. 3784-3790.
'Holographic NDT on Pipes: . . . ' David L. Mader, SPIE vol. 661, Optical Testing & Metrology (1986), pp. 26-35.
'Holograhic NDE: Status & Future' Vest, NTIS, NBS-GCR-81-318, May 1982, pp. 40-47.
'Holographic Moiré in Real Time' Sciammarella et al., Experimental Mechanics, Feb. 1982, pp. 52-63.
'A Speckle Reference Beam Holocamera . . . ' Rowley, J. Phys. E: Sci. Instrum. 21 (1988) 280-286.
'Object Motion Compensation by Speckle Reference Beam Holography' Waters, Applied Optics, vol. 11, No. 3, Mar. 1972, pp. 630-636.
'Optically Phase-Locked Electronic Speckle Pattern Interferometer' Moran et al., Applied Optics, vol. 26, No. 3, 2/1/1987, pp. 475-491.
'Video Holographic Interferometry' Fagan et al., SPIE vol. 746, Industrial Laser Interferometry (1987), pp. 58-60.
'Application of High Repetition Pulsed Lasers . . . ' Tyrer, SPIE, vol. 746, Industrial Laser Interferometry, pp. 98-103.
Brochure, "Holomatic 8000", Laser Technology Inc.

Primary Examiner—Vincent P. McGraw
Assistant Examiner—S. A. Turner
Attorney, Agent, or Firm—Ridout & Maybee

[57] ABSTRACT

A system for carrying out holographic interferometry utilizes the same pulsed laser both for the exposure of holograms and for the reconstruction of combined wavefronts resulting from the exposure of a test object to two time spaced laser pulses. This enables the real-time observation of fringes due to interference due to deformation of a test object between timed spaced laser pulses. Pulses used to reconstruct the combined wavefronts are synchronized to the field interval of a video camera associated with a frame grabber so that the combined image may be presented on a video monitor as a continuous flicker-free image. The combined wavefronts may be obtained from separately exposed holograms, from a hologram together with a direct image of an object produced by the same pulse used to reconstruct the hologram, or from a single hologram double exposed by two laser pulses.

10 Claims, 1 Drawing Sheet

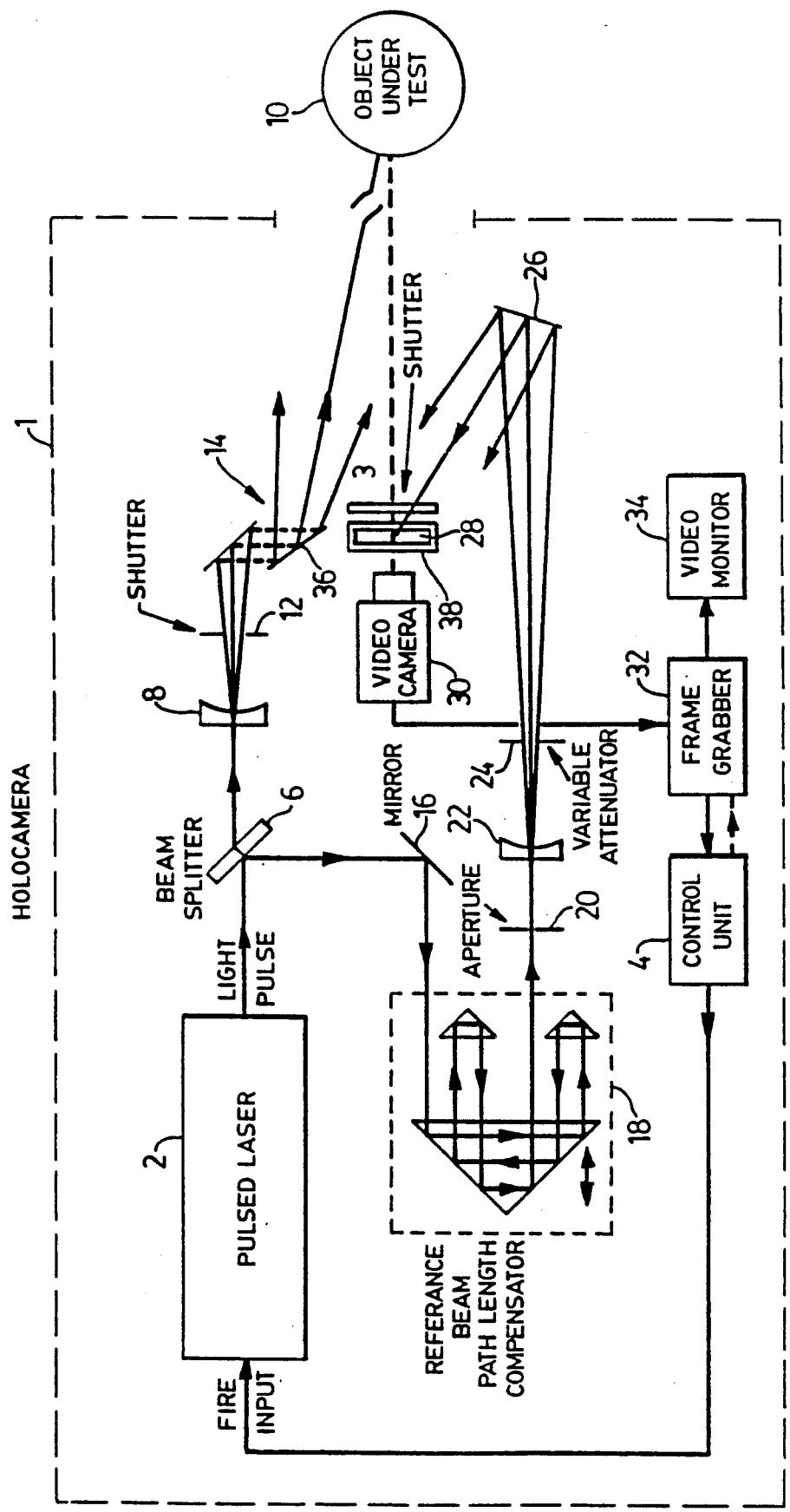

REAL-TIME HALOGRAPHIC INTERFEROMETRY WITH A PULSED LASER AND FLICKER-FREE VIEWING

BACKGROUND OF THE INVENTION

1. FIELD OF THE INVENTION

This invention relates to holographic interferometry, and more particularly to such interferometry as used for the non-destructive testing of components.

2. BACKGROUND OF THE INVENTION

Holographic interferometric techniques have long been used for the non-destructive testing of industrial components. Typically, a first hologram is prepared of a component in an unstressed condition, a second hologram is prepared of the component in a stressed condition, and replicas of the wavefronts of light reflected from the object in its unstressed and stressed conditions reconstructed from the holograms are combined so that phase differences between them show up as patterns of interference fringes which characterize distortions of the component. In another technique, only a first hologram is prepared and its reconstructed wavefront is combined with light reflected directly from the object, so that the effect of the distortions can be viewed on a real time basis.

Various problems must be solved in implementing such techniques, depending on the applications. In every case, since the techniques depend upon the combination of wavefronts representing a test piece at different intervals in time, at least one of the wavefronts must be captured and stored in a hologram for a finite interval. Several techniques are known for such storage. Special photographic emulsions are capable of high resolution and sensitivity, but typically require a relatively slow development step which is usually difficult to perform in situ. This in turn creates problems in accurately locating the developed hologram at its original location. Two types of holographic recording apparatus address this problem. One uses photographic emulsions located in a liquid holding cell so that development with photographic chemicals can be done in situ. The other type uses photosensitive thermoplastic plates which are developed in situ by electrical and electronic means. In another technique, various phototropic materials are known which undergo short term changes in their optical properties on exposure to light and can thus be utilized for the short term storage of holograms, but use of such materials entails that the temporal separation between generation of successive holograms is matched to the response and storage properties of the medium, thus severely limiting the applicability of such systems. In a technique related to holography known as speckle interferometry, many systems rely upon electronic video cameras to capture images which can thereafter be manipulated electronically. Although video technology is constantly improving, such systems have traditionally been subject to the limited resolution of the images which can conveniently be stored and processed, limitations in the resolution of the original images having severe effects upon the information content of the resulting interferometric image. For this reason, optical methods of combining holographic wavefronts provide interferometric images of generally superior quality and information content.

In holographic interferometry systems, at least one of the wavefronts of the test piece must be reconstructed from a hologram. Ideally, this reconstruction makes use of the same laser that was originally utilized to produce the hologram. In practice, this may be difficult. Particularly in applications where it is desired to "freeze" motion of the test piece, e.g. where it is subject to vibration, the use of a high power pulsed laser to expose the hologram is desirable, but such lasers are not very suitable for subsequently reconstructing holographic images for observation since the short duration pulses make observation difficult. It is therefore common practice in such cases to utilize a different continuous wave laser for wavefront reconstruction and comparison, but since the laser used for reconstruction will commonly have a different wavelength, the optical system must be arranged to compensate for this, and there is inevitably some degradation of the interferometric data.

SUMMARY OF THE INVENTION

The present invention sets out to provide a holographic interferometer for the non-destructive examination of test pieces which makes use of but a single source of pulses of coherent light both for hologram production and subsequent reconstruction and combination of wavefronts, which can make effective use of video technology whilst permitting effective recovery of interferometric data, and which can be implemented utilizing known and readily available components.

The present invention provides a method of holographic interferometry wherein successive wavefronts reflected from an object are produced by pulses of substantially coherent light from a common source, at least one of said wavefronts is stored as an exposed and developed hologram, said at least one wavefront is reconstructed from said at least one hologram by a subsequent pulse of light from the same source and combined with a second image produced by that same pulse, the combined wavefronts are focused to create an image retained by a photosensitive layer of an imaging device, and said retained image is captured for subsequent observation. The second wavefront may either be produced directly by the subsequent pulse, or itself be reconstructed from a second hologram exposed by a pulse different from that which created the first hologram. Typically, pulses from the source, typically a pulsed laser, are synchronized to field blanking intervals of a raster scan video imaging device. If the intervals between pulses need to be longer than the field rate of the video imaging device, a frame grabber may be used to store the combined images between pulses so that flicker is avoided.

The invention also extends to apparatus for implementing the above method. Further features of the invention will be apparent from the following description of a preferred embodiment thereof.

SHORT DESCRIPTION OF THE DRAWING

The sole FIGURE of drawing shows a schematic diagram of apparatus according to the invention.

DESCRIPTION OF THE PREFERRED EMBODIMENTS

The apparatus is shown in schematic form since the individual components are all well known and understood by those skilled respectively in the holographic interferometric art or the video technology art.

A pulsed laser 2 produces pulses of coherent light responsive to control signals from a control unit 4, conveniently a suitably programmed personal computer.

The choice of pulsed laser will depend upon the application and upon the system utilized for recording holograms. Interferometric systems utilizing pulsed lasers commonly utilize pulsed ruby lasers, but since adequate exposure of the holographic medium must be achieved during a single pulse, high energy pulses are commonly required. The pulse repetition rate of high energy ruby lasers tends to be limited by heating effects in the laser, and there is a trade off between pulse magnitude and pulse repetition rate which may make such lasers unsuitable for use in applications requiring high pulse repetition rates.

For many applications, better results may be achieved using a YAG laser, employing a rod of yttrium aluminum garnet doped with neodymium. Whereas a ruby laser generates red light at a wavelength of 694 nm, a YAG laser produces infra red light at 1005 nm which may be converted by a frequency doubling crystal to visible green light at 503 nm; available "instant" holocameras utilizing photoconductive thermoplastic plates sensitized by application in situ of electrostatic charge and developed in situ by the application of heat, have a good sensitivity to light of this wavelength whilst being substantially insensitive to red light.

In some applications it may be appropriate to utilize commercially available double pulse lasers which generate two separate laser pulses, separated in time by up to a millisecond, responsive to a single energizing flashlamp pulse. A single hologram is made and is double exposed by the two pulses. Such holograms can be used to capture small movements occurring between the two pulses, for example when studying high frequency vibration or timed impacts which can be used to trigger the pulses. A single hologram may also be double exposed by successive pulses from a conventional pulsed laser.

Other types of pulsed laser, or alternative sources of pulses of substantially coherent light, compatible with the requirements of the invention may of course be substituted if such substitution appears advantageous. Possible alternative forms of pulsed laser are injection seeded lasers, and pulsed lasers using semiconductor laser diode pumping. Whilst light from a continuous wave laser may be gated to form pulses, in general the pulse length necessary to provide adequate exposure using such lasers will be too great to freeze motion of a test object satisfactorily.

The light pulses from the laser 2 are applied to an optical beam splitter 6 which divides the light into beams along two different paths. In a first light path, the beam is passed through a lens 8 which acts as a beam expander enabling uniform illumination of the object 10 under test. The beam also passes through a normally open shutter 12 which can be used to interrupt it, and a system 14 of fixed and steerable mirrors used to direct the beam onto the object 10, whence a portion of it is reflected back towards a camera 30 focused on the object 10.

In a second light path, the beam is directed by a mirror 16 into a beam length compensator 18 of known type comprising a number of right angle retroreflector prisms which are relatively movable so as to adjust the path length of the beam through the compensator. Other forms of adjustable beam length compensator could of course be used to equalize the path length of the two beams. If a laser is available having sufficient coherence length to compensate for differences in path length, the compensator may not be necessary. The beam from the equalizer 18 is passed through an aperture 20, a beam expander lens 22 and a variable attenuator 24 to a reference beam mirror 26 which directs the expanded beam so as to illuminate a hologram plate or plates 28 supported by an adjustable table 38 in front of the camera 30 in the path between it and the object 10.

The hologram plate (or plates) 28 may be photographic plates which, during a pulse from the laser, is illuminated by light both reflected from the object 10, and light from the reference beam path. Depending on the nature of the plate, the attenuator 24 is adjusted so that the light from the reference beam path is of an appropriate intensity. In the case of a conventional silver halide emulsion photographic plate, the reference beam may have approximately double the intensity of the beam reflected from the object, depending on the characteristics of the emulsion, whereas in the case of photoconductive thermoplastic plates, the optimum reference beam will usually be about ten times the intensity of the reflected beam.

Once such a hologram has been exposed and developed, the wavefront represented by the hologram can be reconstructed and viewed by reexposing the developed plate to the reference beam from the second light path. If only viewing of the reconstructed wavefront is required, the shutter 12 in the first path is closed. Since the laser 2 produces only pulses, generally of extremely short duration, means are provided to make the reconstructed wavefront readily observable. In the present invention, this is achieved by arranging the control unit 4 to synchronize pulsing of the laser with operation of the camera 30. If, as preferred, a video camera is associated with a frame grabber 32, a laser pulse used for reconstruction is timed to occur during a field blanking interval of the video camera, so that a photosensitive layer arranged in the focal plane of the camera is exposed during this interval and thus captures the image. The photosensitive layer may form part of any suitable imaging device in which an image may be retained by a photosensitive layer and subsequently converted to a form in which it may be viewed, for example by conversion to a video signal by raster scanning or equivalent sequential recovery of video data from successive portions of the layer. The video signals are stored by a frame grabber, as well understood in the video art, and an image formed from the stored signal is displayed on a monitor 34 and/or may be recorded for subsequent display or analysis.

The video camera may utilize an image sensing device either of the vacuum tube type such as a vidicon, or a solid state type such as a charge coupled device. The device chosen should of course be responsive to illumination of the wavelength utilized, and should not be prone to excessive reciprocity failure if the laser pulses used are of very short duration, these being the same considerations that apply to the selection of suitable hologram plates, or to film utilized as the photosensitive layer if the camera 30 is a conventional camera. In order to prevent unwanted exposure of both the photosensitive layer of the camera and the holographic plates to extraneous illumination, a shutter 3 or equivalent means is provided which may be operated by the control unit to pass the laser pulses. The required performance of the shutter depends on the intensity of the extraneous illumination and the sensitivity of the camera and holographic plates. Alternatively or additionally, an optical filter may be used which passes the laser wavelength and blocks other wavelengths of light.

Use of a video camera and frame grabber to view the images of the test object formed from the wavefronts has several advantages. A steady, flicker-free display can be obtained, the observer's eye is protected from exposure to the laser pulses, and computer ready data is available if a digital frame grabber is employed.

In order to perform holographic interferometry, images of the object under test at different points in time must be combined. This can be achieved in various ways. In one technique, the shutter 12 is maintained open during a laser pulse used to reconstruct a developed hologram on a plate 28. The video camera 30 thus receives wavefronts both from the hologram reconstruction and reflected directly from the object under test. The resulting interferometric fringe pattern is captured and stored by the video camera and frame grabber as previously described. Successive pulses from the laser provide successive combinations with the reference wavefront stored by the hologram, thus enabling real time observation of the fringes produced by interference between the reference wavefront and the wavefront produced by the most recent pulse. Since the combination of the wavefronts takes place prior to their capture by the video camera, the disadvantages attendant upon electronic combination are avoided. Furthermore, the use of the same laser for both forming and reconstructing wavefronts enables exact reconstruction. A short pulse duration enables any vibratory or other movement of the test object or the apparatus to be frozen, and the control unit 4 may be further synchronized to some movement parameter of the test object, for example, a vibration frequency, so as to facilitate observation using stroboscopic techniques.

Maximum repetition rates will be determined by the pulse rate of which the laser is capable and/or the time taken by the video camera to scan a frame. The variable attenuator 24 in the reference light path can be adjusted to optimize the contrast of the observed interference fringes. Fringes due to overall movement of the object 10 relative to the apparatus may be removed in known manner leaving only fringes due to deformation of the object either by adjustment of the movable mirror in the system 14, or by tilting of the table 38 supporting the hologram. More extensive adjustment may be achieved by movement of an housing 1 which supports at least the optical components of the apparatus. The availability of images on the monitor 34 which are updated in real time greatly facilitates these adjustments, which may be made manually or could be performed automatically using available image tracking software for the control unit 4. This technique will be referred to for convenience as the "real time technique".

Secondly, a sandwich hologram technique may be used as described by N. Abramson in "The Making and Evaluation of Holograms", Academic Press, Toronto, 1980. In this case, two separate holograms are prepared using the technique already described above. These holograms represent the state of the object at two different points in time. The holograms may be developed in situ if a hologram recording device permitting this is used, or they may be developed elsewhere and then be returned to their original exposure locations as described by Abramson. If silver halide or other presensitized plates are used, then compensating plates are put in the location of the other hologram during the exposures as taught by Abramson. Alternatively, if plates such as photoconductive thermoplastic plates which are sensitized in situ are used, only the one plate to be exposed is sensitized prior to the exposure and is developed before the second plate is exposed, obviating the need for the use of compensating plates and eliminating fringe pattern distortions caused by their use. An interferometric fringe pattern is reconstructed and captured as already described above, with the shutter 12 closed.

Thirdly, a double exposure hologram may be produced which may be simply reconstructed and observed as already described above. The double exposure hologram may be exposed by two individual pulses from a single pulse laser, or by a double pulse from a double pulse laser. It may be reconstructed by either a single or a double pulse, but does not permit compensation to be made for overall movement of the test object since the fringes are frozen in. The double pulse will not affect reconstruction, since both pulses will be close enough together to occur during the same frame interval of the video camera. The method is essentially similar to the sandwich method, except that both images are formed on the same plate, and their temporal separation is determined by the characteristics of the double pulse laser.

Tests have been made of the first two of these techniques. The real time technique was tested by setting up the apparatus on a table, the test object being the door of a cabinet standing on the floor behind the table. A reference hologram of part of the door was prepared using a photoconductive thermoplastic plate sensitized with electrostatic charge and developed in situ by heating for about ten seconds. An interferogram, formed as already described above by a subsequent laser pulse after the door was heated, by touching it at one spot, exhibited a pattern of curved fringes illustrating uneven thermal expansion. Successive interferograms of the door without such artificial heating were seen to vary from pulse to pulse as the response of the door to ambient vibration was caught at different points of the pulse cycle. The test was carried out using a frequency doubled YAG laser as discussed above.

The sandwich technique was tested by preparing a pair of holograms, as described above using a pulsed YAG laser and glass plates with silver halide emulsions, of a can of Coca-Cola (Trade Mark) carbonated beverage, the second of the holograms being of the can after it was strained by the application of a rubber band. The pair of holograms was viewed using the video system described with the laser being pulsed five times per second. Initially, a fringe pattern was visible which showed the effect of deformation of the can by the rubber band combined with fringes produced by a slight degree of overall movement of the object when the rubber band was applied. By tilting the table 38, it was possible to eliminate the unwanted fringes due to overall movement, as described by Abramson.

Both techniques enable the effects of vibration and object displacement to be compensated or eliminated to a degree that will permit holographic interferometry to be conducted in many cases without the need of a vibration-isolation table to support the apparatus, and in circumstances in which displacement of the object may occur during observation, for example, due to overall deformation or displacement of the latter under load such as that due to the Bourdon effect in elongated curved pressure vessels. These relaxations in operating conditions mean that the apparatus can be configured as portable equipment for field use, rather than being restricted to the laboratory.

I claim:

1. A method of holographic interferometry, wherein successive wavefronts reflected from an object are produced by successive pulses of substantially coherent light from a pulsed laser, one of said wavefronts is stored as an exposed and developed hologram, that wavefront is successively reconstructed from the hologram by subsequent pulses of light from the same pulsed laser, each reconstructed wavefront is combined with a second wavefront produced by reflection of the same pulse directly from the object, the combined wavefronts are sensed by a video camera focused on the object and converted into electrical signals, the electrical signals are stored by a video frame grabber synchronized with the laser pulses, and a video monitor driven by the frame grabber provides continuously refreshed views of fringes produced by interference between the wavefronts.

2. A method according to claim 1, wherein the exposed and developed hologram is recorded on a holographic plate both rendered sensitive to light in situ and exposed and developed in situ between the object and the video camera.

3. A method according to claim 1, wherein the pulsed laser is synchronized to the field blanking intervals of the video camera.

4. Apparatus for holographic interferometry comprising:
   a pulsed laser for producing pulses of substantially coherent light;
   control means for said laser;
   a beam splitter receiving light pulses from the laser and directing them along a first illuminating path towards a test object and a second reference path towards a hologram plate positioned to receive light reflected from the test object, a hologram representing a wavefront reflected from the object as a result of exposure to a light pulse from the laser being developed on the plate:
   a video camera aligned and focused to form an image of the test object observed through the hologram plate, including means to convert said image into electrical signals;
   a video frame grabber connected to receive said signals from the video camera;
   control means connected to synchronize operation of said laser, said video camera and said frame grabber so that pulses from said laser occur during a field blanking interval of said video camera; and
   a video monitor receiving video signals from said frame grabber to display continuously refreshed images from said frame grabber, including fringes due to interference between wavefronts reflected from the test object and wavefronts reconstructed from the hologram plate.

5. Apparatus according to claim 4, wherein the means to support the hologram plate is an adjustable table.

6. Apparatus according to claim 4, wherein said hologram plate is of a type which can be sensitized to light in situ.

7. Apparatus according to claim 4, including means to develop in situ the hologram formed on the hologram plate.

8. Apparatus according to claim 4, wherein the first illumination path includes a mirror tiltable to adjust the angle of incidence of light illuminating the test object.

9. Apparatus according to claim 4, wherein at least optical components of the apparatus are provided with a housing, and the location of the housing relative to the object is adjustable.

10. Apparatus according to claim 4, including means to adjust the length of at least one of said paths.

* * * * *